(12) United States Patent
Romano et al.

(10) Patent No.: US 10,518,910 B1
(45) Date of Patent: Dec. 31, 2019

(54) AGILE ATTITUDE CONTROL SYSTEM FOR SMALL SPACECRAFT

(75) Inventors: Marcello Romano, Monterey, CA (US); Paul Oppenheimer, Pacific Grove, CA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 2914 days.

(21) Appl. No.: 12/460,923

(22) Filed: Feb. 26, 2010

Related U.S. Application Data

(60) Provisional application No. 61/156,250, filed on Feb. 27, 2009, provisional application No. 61/221,236, filed on Jun. 29, 2009.

(51) Int. Cl.
*B64G 1/28* (2006.01)
*G01C 19/04* (2006.01)

(52) U.S. Cl.
CPC ............. *B64G 1/286* (2013.01); *G01C 19/04* (2013.01)

(58) Field of Classification Search
USPC ...................................... 244/158.6, 164, 165
See application file for complete search history.

(56) References Cited

U.S. PATENT DOCUMENTS 4,825,716 A * 5/1989 Roberts et al. ................ 74/5.34
2009/0039202 A1* 2/2009 Ogo et al. ..................... 244/165

OTHER PUBLICATIONS

Omagari, Kuniyuki, "Research of Control Momentum Gyros for Micro-Satellites and 3-DOF Attitude Dynamics Simulator Experiments", Sep. 5, 2005, Proc. of The 8th International Symposium on Artificial Intelligence, Robotics and Automation in Space.*
Berner, Reimer. "Control Moment Gyro Actuator for Small Satellite Applications" Apr. 2005. Department of Electrical and Electronic Engineering, University of Stellenbosch.*
Miniature Reaction and Momentum Wheels for Nanosatellites, IntelliTech Microsystems, Inc. Retrieved from the Internet: <URL: http://www.imicro/biz/space/html>. (3 pages).

* cited by examiner

Primary Examiner — Joseph W Sanderson
(74) Attorney, Agent, or Firm — Naval Postgraduate School; Lisa A. Norris

(57) ABSTRACT

An agile attitude control system (AACS) that is a three axis attitude control device for small spacecraft based on miniature single gimbal control moment gyroscopes (SGCMGs) actuators. The AACS enables agile attitude slewing and accurate pointing/tracking for spacecraft made of multiple CubeSat units, or, more generally, for nanosatellites.

15 Claims, 6 Drawing Sheets

AGILE ATTITUDE CONTROL SYSTEM FOR SMALL SPACECRAFT

CROSS-REFERENCE TO RELATED APPLICATIONS

This application claims the benefit of U.S. Provisional Application No. 61/156,250, filed Feb. 27, 2009, and of U.S. Provisional Application No. 61/221,236, filed Jun. 29, 2009, each of which are hereby incorporated in their entirety by reference.

BACKGROUND OF THE INVENTION

1. Field of the Invention

The present invention relates generally to attitude control systems. More particularly, the present invention relates to attitude control systems for small spacecraft.

2. Description of the Related Art

Existing attitude control systems for small spacecraft, such as nanosatellites, have limited generated torque and angular momentum storage capabilities. In particular, only one attitude control system is commercially available for the three axis attitude control system of small spacecraft, such as CubeSats. That system is a three-axis reaction wheel system and has limited generated torque and angular momentum storage capabilities.

SUMMARY OF THE INVENTION

Embodiments in accordance with the agile attitude control system (AACS) described herein provide agile and accurate attitude control for very small spacecraft, such as the class of nanosatellites. Embodiments in accordance with the agile attitude control system (AACS) described herein include miniature single gimbal control moment gyroscopes (SGC-MGs) that provide higher torque/power ratios and higher torque/volume ratios than conventional reaction wheel systems currently used in small space systems.

In accordance with one embodiment, an agile attitude control system includes: a plurality of miniature single gimbal control moment gyroscopes (SGCMGs); and one or more electronic components coupled with the plurality of miniature SGCMGs. In one embodiment, the agile attitude control system is entirely contained within the volume of 1 liter or less and has a total mass of 1 kilogram or less. In one embodiment, the plurality of miniature SGCMGs are arranged in a "Box 90" configuration with β=90°. In another embodiment, the plurality of miniature SGCMGs arranged in a pyramidal configuration with base angle β=57.4°.

In accordance with another embodiment, a miniature single gimbal control moment gyroscope (SGCMG) includes: a single flywheel rotor assembly; a slip ring assembly coupled with the rotor assembly; a gimbal assembly coupled with the slip ring assembly; and a magnetic encoder coupled with the gimbal assembly. In one embodiment, the miniature SGCMG further includes a hall sensor.

Embodiments in accordance with the invention are best understood by reference to the following detailed description when read in conjunction with the accompanying drawings.

Embodiments in accordance with the invention are further described herein with reference to the drawings.

DETAILED DESCRIPTION OF THE INVENTION

Embodiments in accordance with the agile attitude control system (AACS) described herein provide agile and accurate attitude control for very small spacecraft, such as the class of nanosatellites. Herein the phrase small spacecraft refers to the class of nanosatellites generally termed by those of skill in the art of space systems to indicate spacecraft with mass of the order of 1 kg (kilogram) to 10 kg. Nanosatellites include, in particular, the CubeSat spacecraft class.

Embodiments in accordance with the agile attitude control system described herein provide substantially improved performance over prior art systems with regard to the term of maximum output torque and, especially, maximum angular momentum storage. The higher angular momentum capability enables a much higher slewing rate to be achieved and allows disturbance torques to be rejected more effectively. Additionally, due at least in part to the physics of control moment gyroscopes, embodiments in accordance with the invention require less power to operate.

More particularly, embodiments in accordance with the agile attitude control subsystem (AACS) described herein include miniature single gimbal control moment gyroscopes (SGCMGs). The miniature SGCMGs provide higher torque/power ratios and higher torque/volume ratio than conventional reaction wheel systems currently used in small space systems.

Generally viewed, the agile attitude control system (AACS) described herein is a three axis attitude control device for small spacecraft based on miniature single gimbal control moment gyroscopes (SGCMGs) actuators. The AACS enables agile attitude slewing and accurate pointing/tracking for spacecraft made of multiple (2-5+) CubeSat units, or, more generally, for nanosatellites. These attitude control capabilities are highly desirable for several critical space missions, such as Earth imaging, optical communications, and other DOD and civilian applications.

Figure 1:
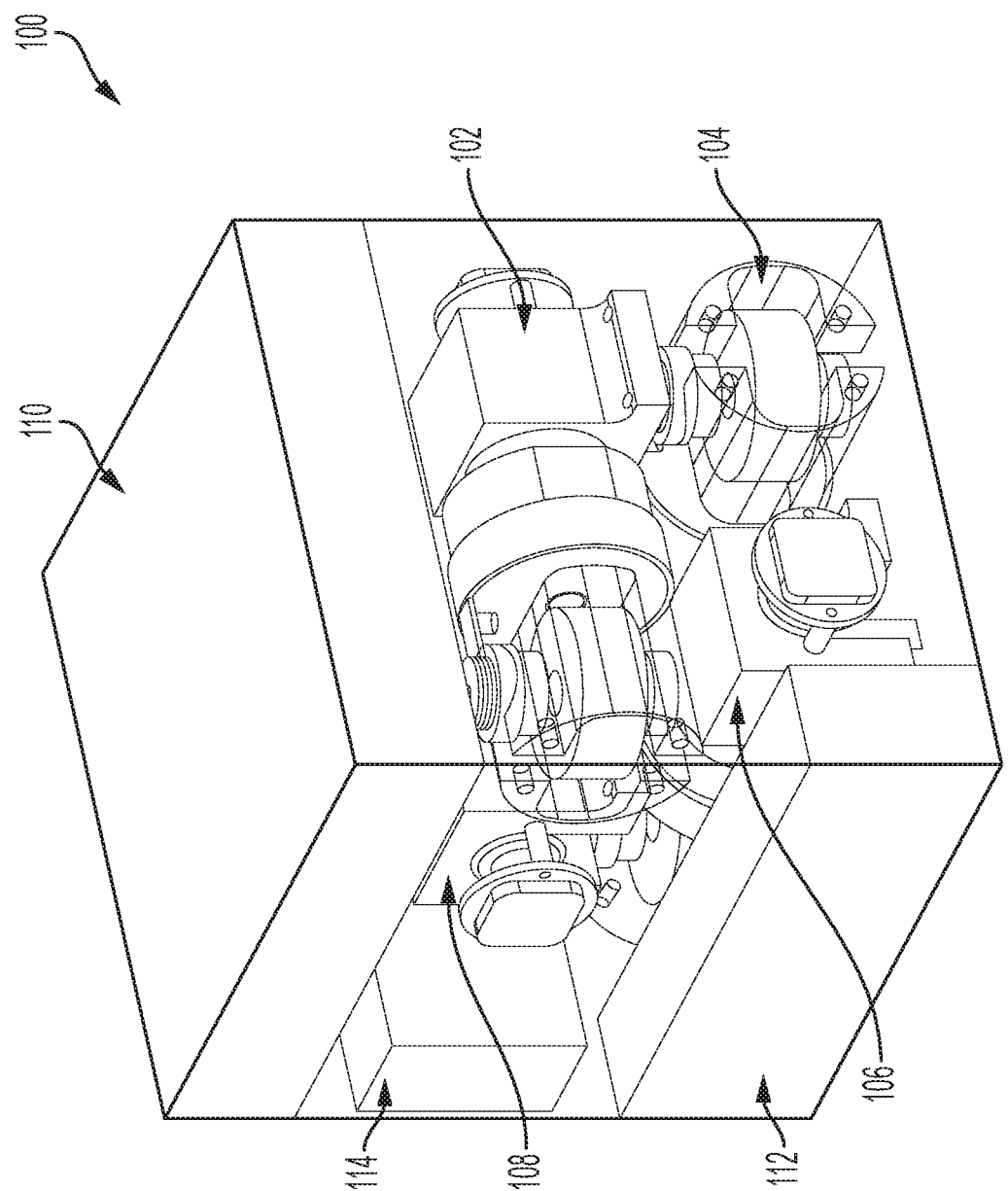
FIG. 1 is a generalized perspective volume allocation block drawing of an agile attitude control system (AACS) in accordance with one embodiment.

FIG. 1 is a generalized perspective volume allocation block drawing of an agile attitude control system (AACS) 100 in accordance with one embodiment. Referring now to FIG. 1, agile attitude control system (AACS) 100 includes a plurality of miniature single gimbal control moment gyroscopes (SGCMGs) 102, 104, 106, 108; and one or more electronic components 110, 112, 114 communicatively coupled with the plurality of miniature SGCMGs 102, 104, 106, 108. One or more electronic components 110, 112, 114 include: a control electronic component; an amplifier electronic component; and a power conversion electronic component.

In one embodiment, AACS 100 is entirely contained within the volume of 1 liter or less and has a total mass of 1 kilogram or less. In a further embodiment, AACS 100 is entirely contained in a cube shape of 10 cm (centimeters) per side and within a volume at or less than 1 liter and has a total mass at or less than 1 kilogram.

In an illustrative embodiment, electronic components 112, 114 are 9.4 cm×3.0 cm×1.7 cm in size and electronic component 110 is 9.4 cm×9.4 cm×2.5 cm in size. In one embodiment, the electronics are designed as printed circuit boards (PCBs). Electronic component 110 is the control electronic component, electronic component 112 is the amplifier electronic component, and electronic component 114 is the power conversion electronic component.

AACS 100 includes a structural interface (not shown) for fixing the plurality of miniature SGCMGs 102, 104, 106, 108 and the one or more electronic components 110, 112, 114 in specified positions. AACS 100 further includes a structural interface (not shown) that further provides electrical, data, and mechanical interconnections between AACS 100 and one or more external systems, such as a nanosatellite, CubeSat, or other small spacecraft (not shown). The structural interface surrounds miniature SGCMGs 102, 104, 106, 108 and electronic components 110, 112, 114 and is openly structured to facilitate integration with the external structure to allow access for wirings and for hosting elements external to AACS 100. The structural interface fixes the plurality of miniature SGCMGs 102, 104, 106, 108 in a specified orientation. The structural interface is any structure that keeps the elements in FIG. 1 suitably connected in the configuration shown in FIGS. 1, 2A and 2B, such as for example, an openly structured box, cube or box-like structure.

In one embodiment, AACS 100 includes four miniature single gimbal control moment gyroscopes (SGCMGs): miniature SGCMG 102, a first miniature SGCMG, miniature SGCMG 104, a second miniature SGCMG, miniature SGCMG 106, a third miniature SGCMG, and miniature SGCMG 108, a fourth miniature SGCMG.

Figure 2A:
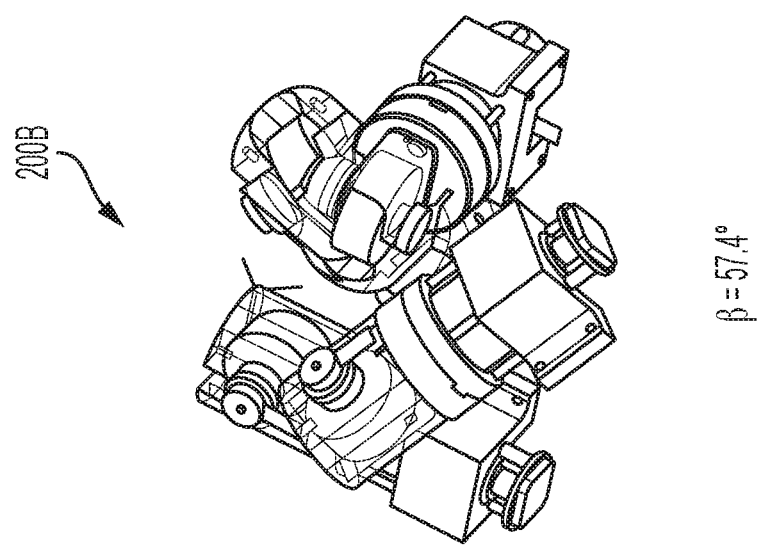
FIG. 2A illustrates an example of miniature SGCMGs arranged in a "Box 90" configuration with β=90° in accordance with one embodiment.

In one embodiment, miniature SGCMGs 102, 104, 106, 108 are arranged in a box formation with base angle β=90° as illustrated in FIG. 1. This formation is sometimes termed a "Box 90" configuration by those of skill in the art. FIG. 2A illustrates an example of miniature SGCMGs 102, 104, 106, 108 arranged in a "Box 90" configuration 200A with β=90°.

Figure 2B:
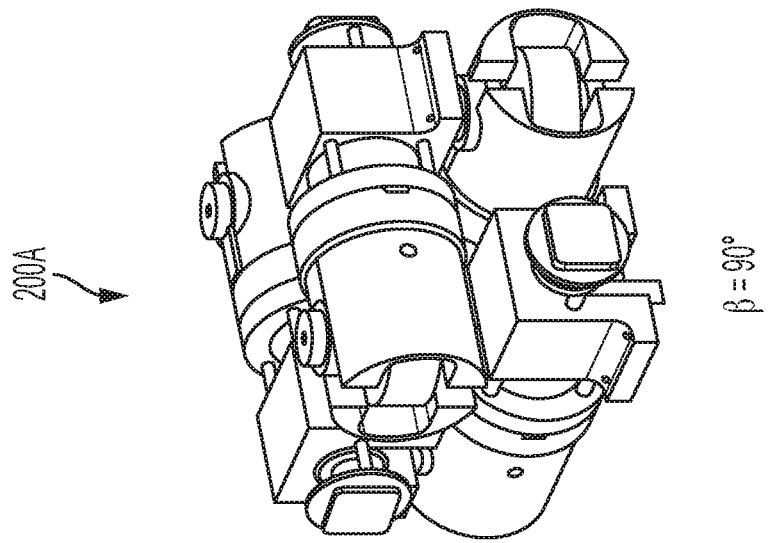
FIG. 2B illustrates an example of miniature SGCMGs arranged in a pyramidal configuration with base angle β=57.4° in accordance with another embodiment.

In another embodiment, miniature SGCMGs 102, 104, 106, 108 are arranged in a pyramidal configuration with base angle β=57.4°, and the angular momentum envelope results in a sphere with radius of at or about 7 mN-m-s. A cube with sides of length 31 mN-m-s would fit inside that sphere, resulting in the ability to provide 15.4 mN-m-s about all three axes simultaneously. FIG. 2B illustrates an example of miniature SGCMGs 102, 104, 106, 108 arranged in a pyramidal configuration 200B with base angle β=57.4°.

In an illustrative embodiment, each miniature SGCMG 102, 104, 106, 108 has dimensions 32 mm (millimeters) in diameter by 76 mm long. Each miniature SGCMG has 8.4 mN-m-s (millinewton meter per second) of angular momentum. The maximum output torque is at least 10 mN-m. The overall power consumption is between the range at or about 0.4 W to 1.5 W.

In one embodiment, at least three miniature magnetotorquers (not shown) are used together with miniature SGC-MGs 102, 104, 106, 108 for angular momentum dumping. The miniature magnetotorquers are mounted internally to AACS 100, while in alternate embodiments, the miniature magnetotorquers are mounted in another location on or in the external structure, e.g. the small spacecraft.

Figure 3:
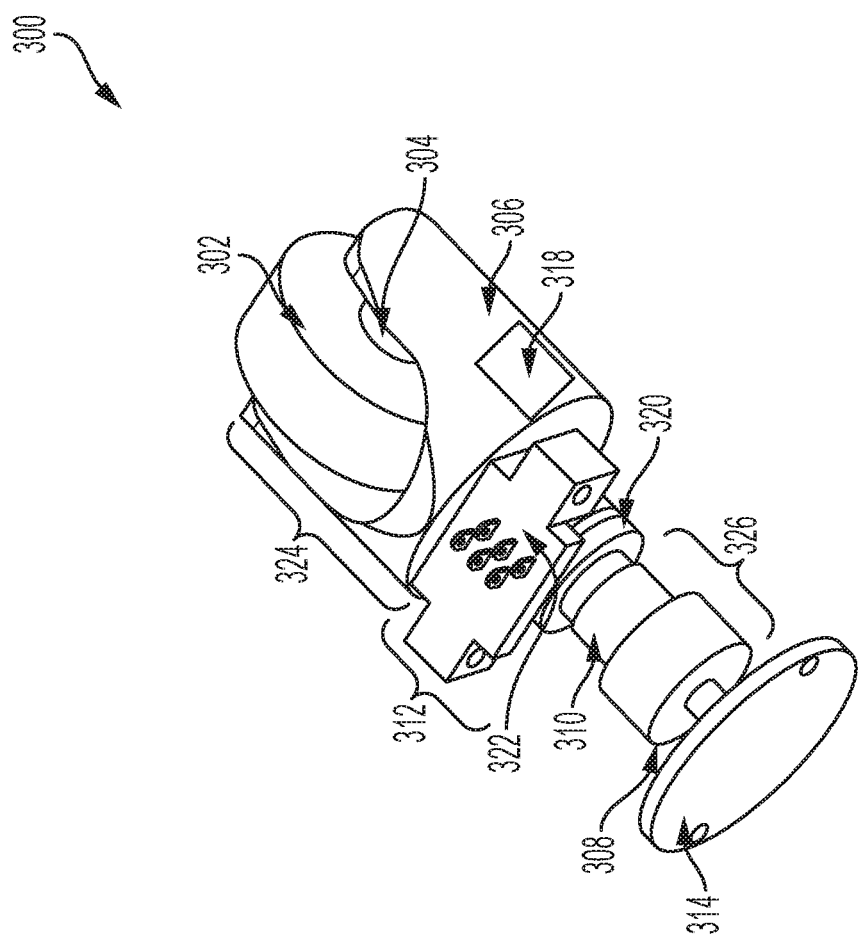
FIG. 3 illustrates a perspective drawing of a miniature single gimbal control moment gyroscope (SGCMG) in accordance with one embodiment.
Figure 4:
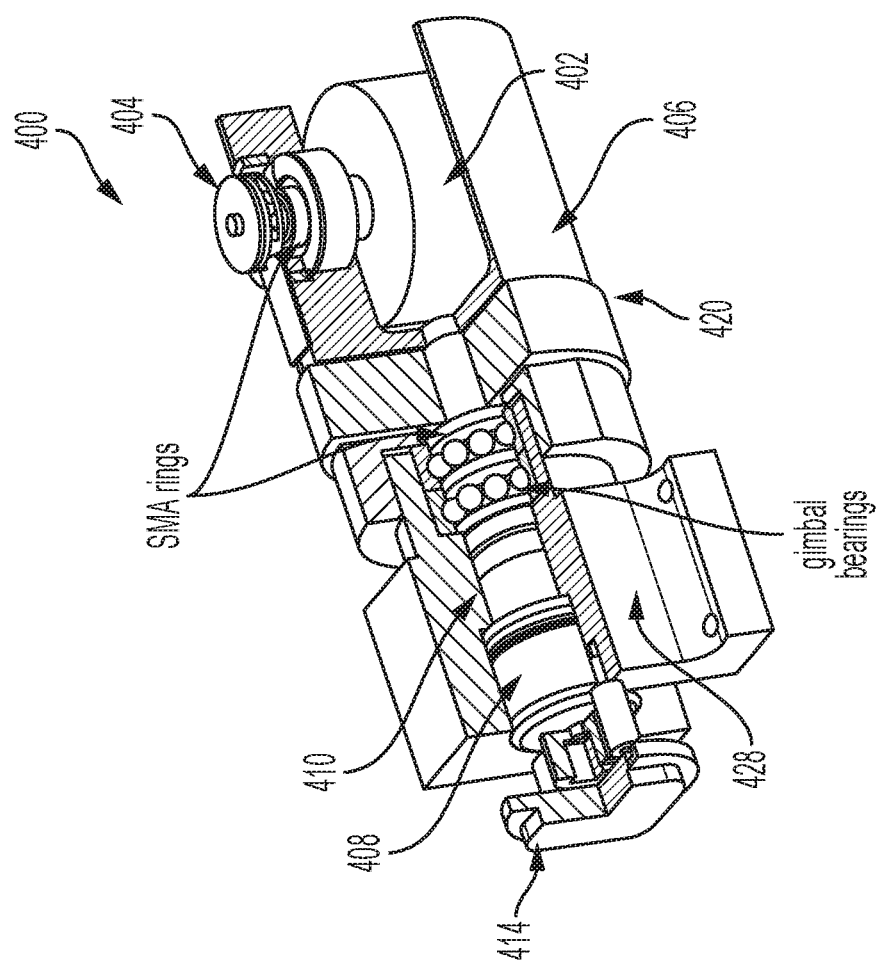
FIG. 4 illustrates a cutaway perspective drawing of a miniature SGCMG and includes a gimbal housing in accordance with one embodiment.

FIG. 3 illustrates a perspective drawing of a miniature SGCMG 102 in accordance with one embodiment. FIG. 4 illustrates a cutaway perspective drawing of the miniature SGCMG of FIG. 3 and includes a gimbal housing in accordance with one embodiment. Referring now to FIGS. 3 and 4, each miniature SGCMG 102, 104, 106, 108, represented here by miniature SGCMG 102 for ease of description, includes a rotor assembly 324 including a single flywheel rotor 302 coupled with a rotor motor 304 and encased in a rotor housing 306. A slip ring assembly 312 couples rotor assembly 324 to a gimbal assembly 326 including a gimbal motor 308 with harmonic drive gear 310 encased in a gimbal housing 328. A magnetic encoder 314 is coupled to gimbal assembly 326. In one embodiment, a hall sensor 318 is coupled to rotor assembly 324. In another embodiment, hall sensor 318 is coupled to rotor housing 306.

In operation, magnetic encoder 314 reads the angular position of gimbal motor 308. In one embodiment, gimbal housing 328 mounts to a stationary surface tied to a primary external structure. In another embodiment, gimbal housing 328 is mounted on a structural interface of AACS 100.

Gimbal motor 308 rotates rotor assembly 324 through the harmonic gear driven shaft of harmonic gear 310. Slip ring assembly 312 passes motor winding connections through the rotary joint allowing continuous 360° operation. In an illustrative embodiment, rotor 302 is mounted with a compliant preloaded set of duplex pair angular contact bearings internal to rotor housing 306. In one embodiment, both the gimbal bearings and rotor bearings are mounted with the aid of shape-memory alloy (SMA) retaining rings.

Rotor 302 is actuated by rotor motor 304, which in an illustrative embodiment, is a brushless DC motor. Slip ring assembly 312 includes space rated slip rings 320 connected to a slip ring brush block 322 and is used for electrical connection of rotor motor 304.

Gimbal motor 308 is connected to slip ring assembly 312. In an illustrative embodiment, gimbal motor 308 is a brushless DC motor and is integrated with harmonic drive gear 310. Magnetic encoder 314 is connected to gimbal motor 308. Magnetic encoder 314 is used to accurately measure the angular position of gimbal assembly 326 with respect to the external structure, e.g., a spacecraft. In one embodiment magnetic encoder 314 is a non-contact magnetic encoder.

In an illustrative embodiment, gimbal motor 308 is a Maxon ECF 14 brushless DC motor, part number 339251 with Braycote grease and a power rating of 1.5 W (available from Maxon Motor, Switzerland). In operation the gimbal rate of gimbal motor 308 is controllable to within +/−0.5°/sec on the slow speed side. In one embodiment, the gimbal rate commands are bidirectional and from 0 to +/−20°/sec (0.35 rad/sec).

In an illustrative embodiment, rotor motor 304 is a Maxon EC10F motor, part number 30199 with Braycote grease and power rating of 0.2 W (available from Maxon Motor, Switzerland). In operation rotor motor 304 has a nominal spin rate of 12,000 rpm and peak of 15,000 rpm. Rotor motor 304 speed is controllable to within +/−150 rpm of the desired value during all modes of operation. Rotor motor 304 spins in the clockwise direction, looking at rotor motor 304 from rotor 302.

In an illustrative embodiment, slip ring assembly 312 is a Sibley Company 5 power ring assembly rated at 0.75 amps @ 12V with a 6 RPM max but not continuous from −20° C. to +50° C. and is bi-directional (available from The Sibley Company, Connecticut). Slip ring assembly 312 further has ID minimum=0.250" and OD maximum=1.25".

In an illustrative embodiment, magnetic encoder 314 is a magnetic encoder from Renishaw with option 1B for increased temperature operation (available from Renishaw Inc., Illinois). In an illustrative embodiment, magnetic encoder 314 is a RMB201C series 13 bit incremental encoder for 8192 counts per revolutions. With a gear reduction of 160:1 from the harmonic gear, the motor output has 1,310,720 cts/rev or a count every 0.00027 deg (0.99 arc sec). The magnet rotates clockwise.

In an illustrative embodiment, harmonic gear 310 is a MicroMotion harmonic gear, part number MHD-10 (available from MicroMotion-gmbh, Germany) and is installed directly on gimbal motor 308.

In an illustrative embodiment, hall sensor 318 is an Optek OMH3040B hall sensor (available from OPTEK Technology, Texas) used on the slow speed side of rotor assembly 324 as an index for the position measurements.

In an illustrative embodiment, miniature SGCMGs 102, 104, 106, 108 are packaged in AACS 100 together with driver electronics for rotor motor 304 and gimbal motor 308 based on printed circuit board (PCB) technology. In this embodiment, a printed circuit board including non-volatile memory is included in AACS 100, for example, in electronic components 110, 112, and/or 114. The printed circuit board is based on FPGA, ASICS or other microprocessor technology.

Although not shown in FIGS. 1-4 it can be understood by those of skill in the art that mechanical, electronic and data connections are included and can be implemented in various configurations.

Figure 5:
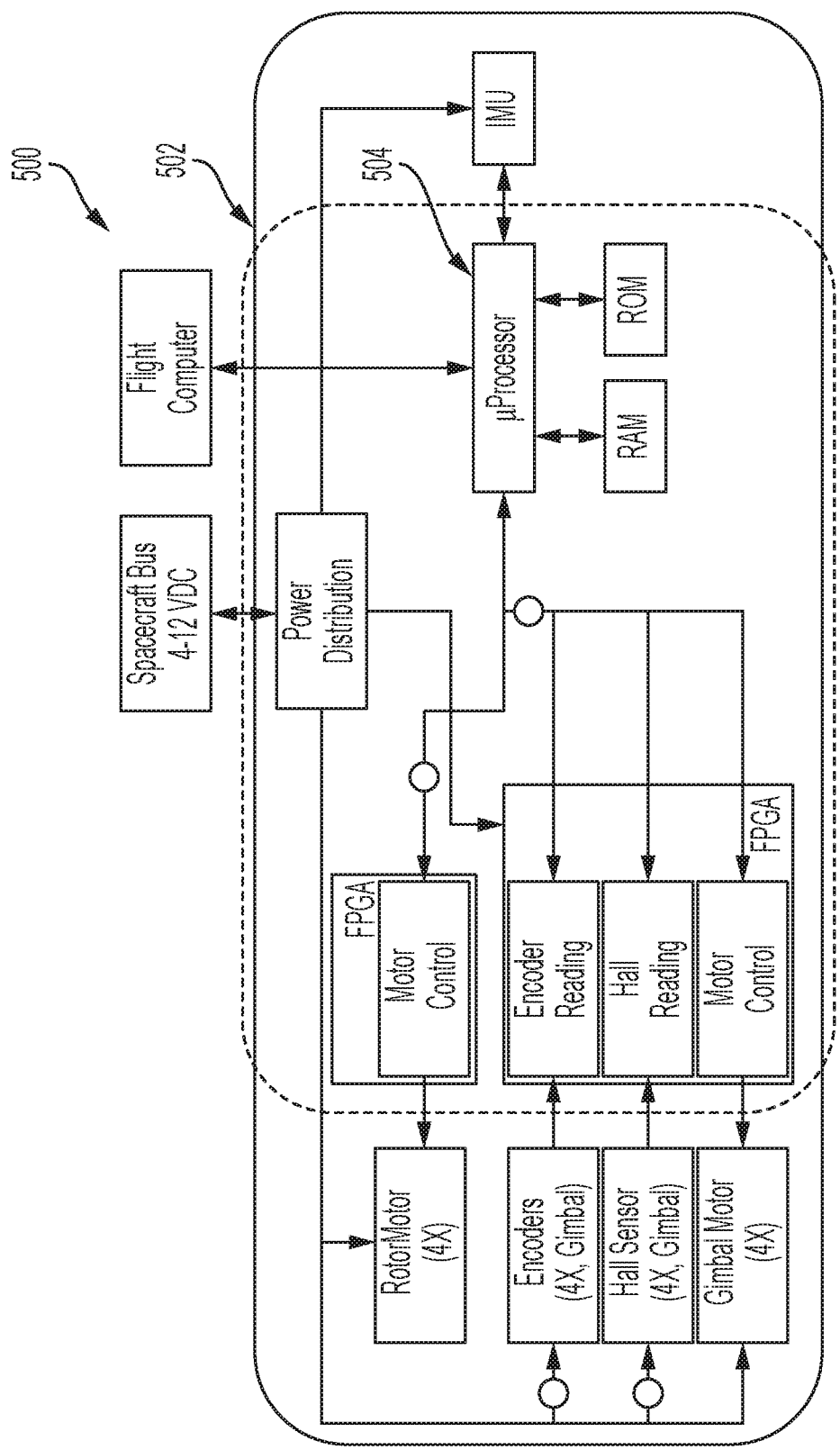
FIG. 5 illustrates a high level architecture of an agile attitude control system (AACS) in accordance with one embodiment.

FIG. 5 illustrates a high level architecture 500 of an agile attitude control system (AACS) 100 system in accordance with one embodiment. Referring to FIG. 5, AACS 100 system is a self-contained suite including one or more micro-processors which can perform attitude determination with embedded inertial measurement unit (IMU) and/or external sensors. The one or more microprocessors then commands the gimbal and motor rates.

In this embodiment, a printed circuit board 502 includes a microprocessor 504 which runs, i.e., executes, software including: (1) an attitude control algorithm; (2) a gimbal steering law algorithm; (3) an internal singularity avoidance algorithm; and (4) one or more momentum dumping algorithms.

Microprocessor 504 performs steering laws, singularity avoidance, communication to flight computer, communication to field programmable gate array(s) (FPGAs), fault detection mode selection, data storage, attitude determination and control. Microprocessor 504 runs preplanned experimental maneuvers or accepts external torque commands in the spacecraft coordinate system. Microprocessor 504 shuts down components not in use for specific modes via digitally activated switches.

Microprocessor 504 includes functions that perform attitude determination with an embedded IMU and/or with external sensors. Microprocessor 504 then controls the gimbal and motor rates via field programmable gate array(s) (FPGAs). In one embodiment, the FPGA(s) are used as motion controllers with the ability to incorporate magnetic encoder 314 and hall sensor 318 feedback. The FPGA(s) are responsible for determining the gimbal speed and positions (slow speed side) and to report back to microprocessor 504. In one embodiment, separate FPGAs are used to control the motor rotors 304 and gimbal motors 308. In a further embodiment, a separate FPGA controls all four rotor motors 304 at a constant rate.

It can be understood by those of skill in the art that the above detailed architecture 500 is but one example and that a variety of other architectures are also possible.

Figure 6:
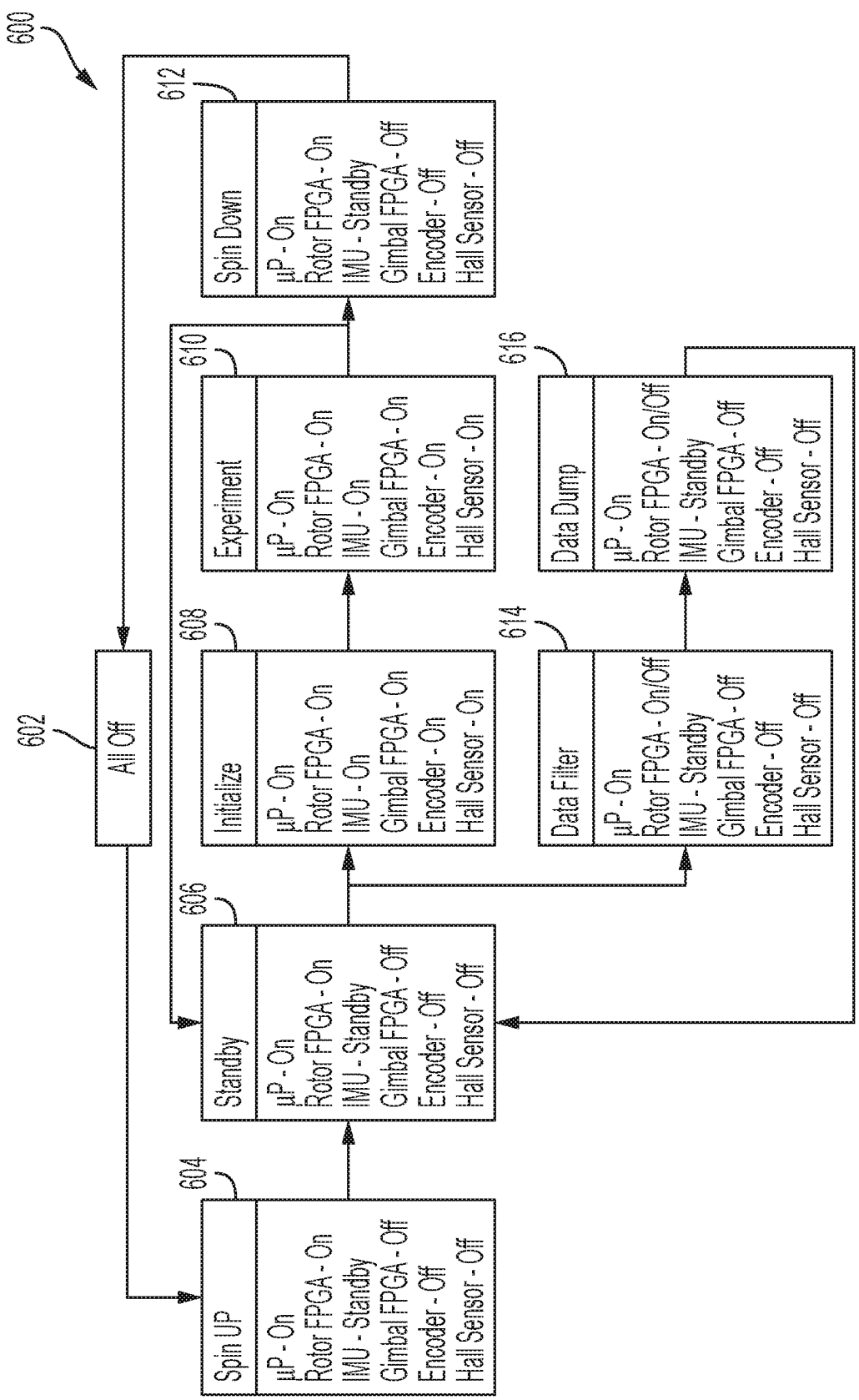
FIG. 6 illustrates a process diagram of operational flow of an AACS implemented as a standalone system in accordance with one embodiment.

FIG. 6 illustrates a process diagram of operational flow of an AACS 100 as a standalone system in accordance with one embodiment. Referring now to FIG. 6, AACS 100 can be operated as a standalone system in either a ground test bed or flight experiment. After spacecraft checkout, AACS 100 is powered up and rotor motors, i.e., rotor motors 304, are spun up to a constant speed. Rotor motors 304 remain at that constant speed unless an internal fault is detected or commanded by the external system, e.g., the spacecraft, to spin down due to a higher level fault. AACS 100 is at its quiescent power profile for this period. The spacecraft is uncontrolled by AACS 100 in this regime.

For pre-planned maneuvers, the program moves through a series of modes described below for a total experiment time of less than 5 minutes. The AACs system can reach its peak power at this time. The AACS system can be commanded indefinitely in direct torque control or 3-axis stabilization modes (optional). The flight computer can then choose when to remove the saved/processed IMU (inertial measurement unit) data for dumping to the ground.

The data filtering or dumping modes can be run while the system is in standby. After a nominal experiment, the system returns to the standby mode. Multiple types of experiments can be run.

Referring to FIGS. 5 and 6, in All Off mode 602 all power is turned off to all systems and microprocessor 604 is set to a sleep mode. In Spin Up mode 604 the rotor FPGA controller is turned on. The rotor motors 304 are brought up to the set constant speed. In Standby mode 606 microprocessor 604 and rotor FPGAs are on commanding a constant rotor speed. All other systems are off.

In Initialization mode 608, encoders, hall sensors, IMU and gimbal FPGAs are turned on. Gimbal motors 308 are rotated until the hall sensor position is detected from gimbal positions initialization and IMU data is recorded. In Experiment mode 610, the pre-planned or torque commanded experiment is run based on the experiment sub-mode. All maneuvers end with the gimbal returning to an indexed, "home" position at the hall sensor. In Spin Down mode 612, rotor motor angular speeds are brought down to zero speed. In Data Filter mode 614 IMU data is post processed to reduce its size before sending to the flight computer. In Data Dump mode 616, filtered IMU data is given to the flight computer for down linking to the ground at a future time.

It can be understood by those of skill in the art that the above detailed process 600 is but one example and that a variety of other system processes are also possible.

Embodiments in accordance with the agile attitude control system described herein provide substantially improved performance over existing attitude control systems for small spacecraft with regard to the term of maximum output torque and, especially, maximum angular momentum storage. The higher angular momentum capability enables a much higher slewing rate to be achieved and allows disturbance torques to be rejected more effectively. Additionally, due at least in part to the physics of control moment gyroscopes, embodiments in accordance with the invention can require less power to operate.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. An agile attitude control system (AACS) comprising:
a plurality of miniature single gimbal control moment gyroscopes (SGCMGs), wherein each of said miniature SGCMGs further comprises:
a single flywheel rotor assembly, said single flywheel rotor assembly further comprising:
a rotor motor,
one or more rotor bearings, and
a rotor housing enclosing said rotor motor and said one or more rotor bearings;
a gimbal assembly, said gimbal assembly further comprising:
a gimbal motor,
a harmonic drive gear,
one or more gimbal bearings, and
a gimbal housing enclosing said gimbal motor and said one or more gimbal bearings;
a slip ring assembly coupled with said single flywheel rotor assembly and with said gimbal assembly, said slip ring assembly located between said single flywheel rotor assembly and said gimbal assembly;
a magnetic encoder coupled with said gimbal assembly; and
a hall sensor coupled with said single flywheel rotor assembly; and
one or more electronic components coupled with said plurality of miniature SGCMGs,
wherein said agile attitude control system is entirely contained within the volume of 1 liter or less and has a total mass of 1 kilogram or less.

2. The agile attitude control system (AACS) of claim 1 wherein said one or more electronic components comprise:
a control electronic component;
an amplifier electronic component; and
a power conversion electronic component.

3. The agile attitude control system of claim 1 wherein said plurality of miniature SGCMGs comprises:
a first miniature SGCMG;
a second miniature SGCMG;
a third miniature SGCMG; and
a fourth miniature SGMG.

4. The agile attitude control system of claim 3 wherein said plurality of miniature SGCMGs are arranged in a pyramidal configuration with base angle $\beta=57.4°$.

5. The agile attitude control system of claim 3 wherein said plurality of miniature SGCMGs are arranged in a box 90 configuration with base angle $\beta=90°$.

6. The agile attitude control system of claim 1 further comprising:
a structural interface, said structural interface fixing said plurality of miniature SGCMGs and said one or more electronic components in specified positions within a cube shape of about 10 cm per cube side.

7. A miniature single gimbal control moment gyroscope (SGCMG) comprising:
a single flywheel rotor assembly, said single flywheel rotor assembly further comprising:
a rotor motor,
one or more rotor bearings, and
a rotor housing enclosing said rotor motor and said one or more rotor bearings;
a gimbal assembly, said gimbal assembly further comprising:
a gimbal motor,
a harmonic drive gear,
one or more gimbal bearings, and
a gimbal housing enclosing said gimbal motor and said one or more gimbal bearings;
a slip ring assembly coupled with said single flywheel rotor assembly and with said gimbal assembly, said slip ring assembly located between said single flywheel rotor assembly and said gimbal assembly;
a magnetic encoder coupled with said gimbal assembly; and
a hall sensor coupled with said single flywheel rotor assembly.

8. The miniature single gimbal control moment gyroscope (SGCMG) of claim 7 wherein said miniature SGCMG has dimensions 32 mm (millimeters) in diameter by 76 mm long.

9. The miniature single gimbal control moment gyroscope (SGCMG) of claim 7 wherein said miniature SGCMG has 8.4 mN-m-s (millinewton meter per second) of angular momentum.

10. The miniature single gimbal control moment gyroscope (SGCMG) of claim 7 wherein said miniature SGCMG is for use in attitude control of small spacecraft.

11. An agile attitude control system (AACS) for three axis attitude control of small spacecraft comprising:
a plurality of miniature single gimbal control moment gyroscopes (SGCMGs), wherein each of said miniature SGCMGs further comprises:
a single flywheel rotor assembly, said single flywheel rotor assembly further comprising:
a rotor motor,
one or more rotor bearings, and
a rotor housing enclosing said rotor motor and said one or more rotor bearings;
a gimbal assembly, said gimbal assembly further comprising:
a gimbal motor,
a harmonic drive gear,
one or more gimbal bearings, and
a gimbal housing enclosing said gimbal motor and said one or more gimbal bearings;
a slip ring assembly gimbal coupled with said single flywheel rotor assembly and with said gimbal assembly, said slip ring assembly located between said single flywheel rotor assembly and said gimbal assembly; and
one or more electronic means coupled with said plurality of miniature SGCMGs, said one or more electronic means for controlling said plurality of miniature SGCMGs to provide three axis attitude control of external small spacecraft,
wherein said agile attitude control system is entirely contained within the volume of 1 liter or less and has a total mass of 1 kilogram or less.

12. The agile attitude control system of claim 11 wherein said plurality of miniature SGCMGs comprises:
a first miniature SGCMG;
a second miniature SGCMG;
a third miniature SGCMG; and
a fourth miniature SGMG,
and further wherein said plurality of miniature SGCMGs are arranged in a pyramidal configuration with base angle $\beta=57.4°$.

13. The agile attitude control system of claim 11 wherein said plurality of miniature SGCMGs comprises:
- a first miniature SGCMG;
- a second miniature SGCMG;
- a third miniature SGCMG; and
- a fourth miniature SGMG,
- and further wherein said plurality of miniature SGCMGs are arranged in a box 90 configuration with base angle $\beta=90°$.

14. The agile attitude control system of claim 11 further comprising:
- a structural interface, said structural interface fixing said plurality of miniature SGCMGs and said one or more electronic components in specified positions.

15. The agile attitude control system of claim 11 wherein said agile attitude control system is connectable to said external small spacecraft.

\* \* \* \* \*